(12) United States Patent
Newman et al.

(10) Patent No.: US 10,601,090 B2
(45) Date of Patent: Mar. 24, 2020

(54) USING A SPACER TO BLOCK PATH OF THERMALLY CONDUCTIVE STRUCTURAL ADHESIVE IN LITHIUM ION CELLS

(71) Applicant: NextEV USA, Inc., San Jose, CA (US)

(72) Inventors: Austin L. Newman, San Jose, CA (US); Alexander J. Smith, White Lake, MI (US)

(73) Assignee: NIO USA, Inc., San Jose, CA (US)

( * ) Notice: Subject to any disclaimer, the term of this patent is extended or adjusted under 35 U.S.C. 154(b) by 130 days.

(21) Appl. No.: 15/581,216

(22) Filed: Apr. 28, 2017

(65) Prior Publication Data

US 2018/0316071 A1   Nov. 1, 2018

(51) Int. Cl.

| | |
|---|---|
| *H01M 10/653* | (2014.01) |
| *H01M 10/613* | (2014.01) |
| *H01M 10/625* | (2014.01) |
| *H01G 11/18* | (2013.01) |
| *H01M 2/12* | (2006.01) |
| *H01G 11/82* | (2013.01) |

(Continued)

(52) U.S. Cl.
CPC .......... *H01M 10/653* (2015.04); *B60L 50/64* (2019.02); *B60L 50/66* (2019.02); *B60L 53/12* (2019.02); *B60L 53/14* (2019.02); *B60L 58/26* (2019.02); *H01G 11/10* (2013.01); *H01G 11/18* (2013.01); *H01G 11/82* (2013.01); *H01G 11/84* (2013.01); *H01M 2/1077* (2013.01); *H01M 2/1235* (2013.01); *H01M 10/613* (2015.04); *H01M 10/625* (2015.04); *H01M 10/6554* (2015.04); *B60L 2220/46* (2013.01)

(58) Field of Classification Search
CPC ............. H01M 10/653; H01M 10/625; H01M 10/613; H01M 10/0525; H01M 2/1235; H01M 2200/20; H01M 2220/20; H01G 11/84; H01G 11/18; H01G 11/82
See application file for complete search history.

(56) References Cited

U.S. PATENT DOCUMENTS

| | | |
|---|---|---|
| 8,456,807 B2 | 6/2013 | Tallam et al. |
| 8,597,843 B2 | 12/2013 | Yamamoto et al. |

(Continued)

OTHER PUBLICATIONS

Official Action for U.S. Appl. No. 15/455,239, dated Sep. 28, 2018 20 pages.

(Continued)

*Primary Examiner* — Muhammad S Siddiquee
(74) *Attorney, Agent, or Firm* — Sheridan Ross P.C.

(57) ABSTRACT

Embodiment include a power source module comprising one or more power cells. Each power cell can comprise a pressure vent on a side of the power cell. The pressure vent can be adapted to relieve an internal pressure of the cell when the internal pressure exceeds a threshold. A cooling plate can be disposed adjacent and substantially parallel to a side of the one or more power cells having the pressure vent. One or more spacers can be disposed between each of the one or more power cells and the cooling plate and substantially surrounding the pressure vent of one of the one or more power cells. A thermally conductive potting material can be disposed between the one or more power cells and the cooling plate. Each spacer prevents the potting material from intruding into an area around the vent of one of the one or more power cells.

12 Claims, 6 Drawing Sheets

(51) Int. Cl.

| | | |
|---|---|---|
| *H01G 11/84* | (2013.01) | |
| *H01G 11/10* | (2013.01) | |
| *H01M 2/10* | (2006.01) | |
| *B60L 53/12* | (2019.01) | |
| *B60L 50/60* | (2019.01) | |
| *B60L 58/26* | (2019.01) | |
| *H01M 10/6554* | (2014.01) | |
| *B60L 50/64* | (2019.01) | |
| *B60L 53/14* | (2019.01) | |

(56) References Cited

U.S. PATENT DOCUMENTS

| | | | |
|---|---|---|---|
| 9,160,038 B2 | 10/2015 | Buck et al. | |
| 2007/0009787 A1 | 1/2007 | Straubel et al. | |
| 2007/0037053 A1 | 2/2007 | Anantharaman | |
| 2010/0279159 A1 | 11/2010 | Meintschel et al. | |
| 2011/0097614 A1* | 4/2011 | Kim | H01M 2/0237 429/53 |
| 2011/0165446 A1 | 7/2011 | Hermann | |
| 2012/0125447 A1 | 5/2012 | Fuhr et al. | |
| 2013/0183555 A1 | 7/2013 | Boddakayala | |
| 2013/0209858 A1 | 8/2013 | Schmitt et al. | |
| 2013/0337310 A1 | 12/2013 | Omura et al. | |
| 2013/0344362 A1 | 12/2013 | Raisch et al. | |
| 2015/0044538 A1* | 2/2015 | Katayama | H01M 10/6556 429/120 |
| 2015/0093613 A1 | 4/2015 | Obasih et al. | |
| 2015/0101352 A1 | 4/2015 | Kwak et al. | |
| 2015/0140388 A1 | 5/2015 | Harada et al. | |
| 2015/0180098 A1 | 6/2015 | Eckl et al. | |
| 2015/0311485 A1 | 10/2015 | Fister et al. | |
| 2016/0028059 A1 | 1/2016 | Sweney et al. | |
| 2016/0301117 A1* | 10/2016 | Tyler | H01M 2/1094 |
| 2017/0005383 A1 | 1/2017 | Harris | |
| 2017/0200995 A1 | 7/2017 | Phlegm et al. | |
| 2018/0034122 A1 | 2/2018 | Newman | |
| 2018/0048037 A1 | 2/2018 | Newman | |
| 2018/0048039 A1 | 2/2018 | Newman et al. | |
| 2018/0090736 A1 | 3/2018 | Cho et al. | |
| 2018/0219199 A1* | 8/2018 | Lee | H01M 2/26 |
| 2018/0301771 A1 | 10/2018 | Jennrich et al. | |

OTHER PUBLICATIONS

Official Action for U.S. Appl. No. 15/363,004, dated Aug. 16, 2018 15 Pages.

U.S. Appl. No. 15/455,239, filed Mar. 10, 2017, Newman.

De Jong et al., "Low-Stress Interconnections of Solar Cells," Energy Research Centre of the Netherlands, Mar. 28, 2018, retrieved from https://www.ecn.nl/fileadmin/ecn/units/zon/docs/5CO2_2_Jong_P.C._de.pdf, 15 pages.

Final Action for U.S. Appl. No. 15/455,239, dated Apr. 5, 2019 24 pages.

Final Action for U.S. Appl. No. 15/363,004, dated Mar. 7, 2019 22 Pages.

Official Action for U.S. Appl. No. 15/455,239, dated Aug. 29, 2019 26 pages.

Official Action for U.S. Appl. No. 15/363,004, dated Sep. 5, 2019 29 Pages.

* cited by examiner

USING A SPACER TO BLOCK PATH OF THERMALLY CONDUCTIVE STRUCTURAL ADHESIVE IN LITHIUM ION CELLS

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
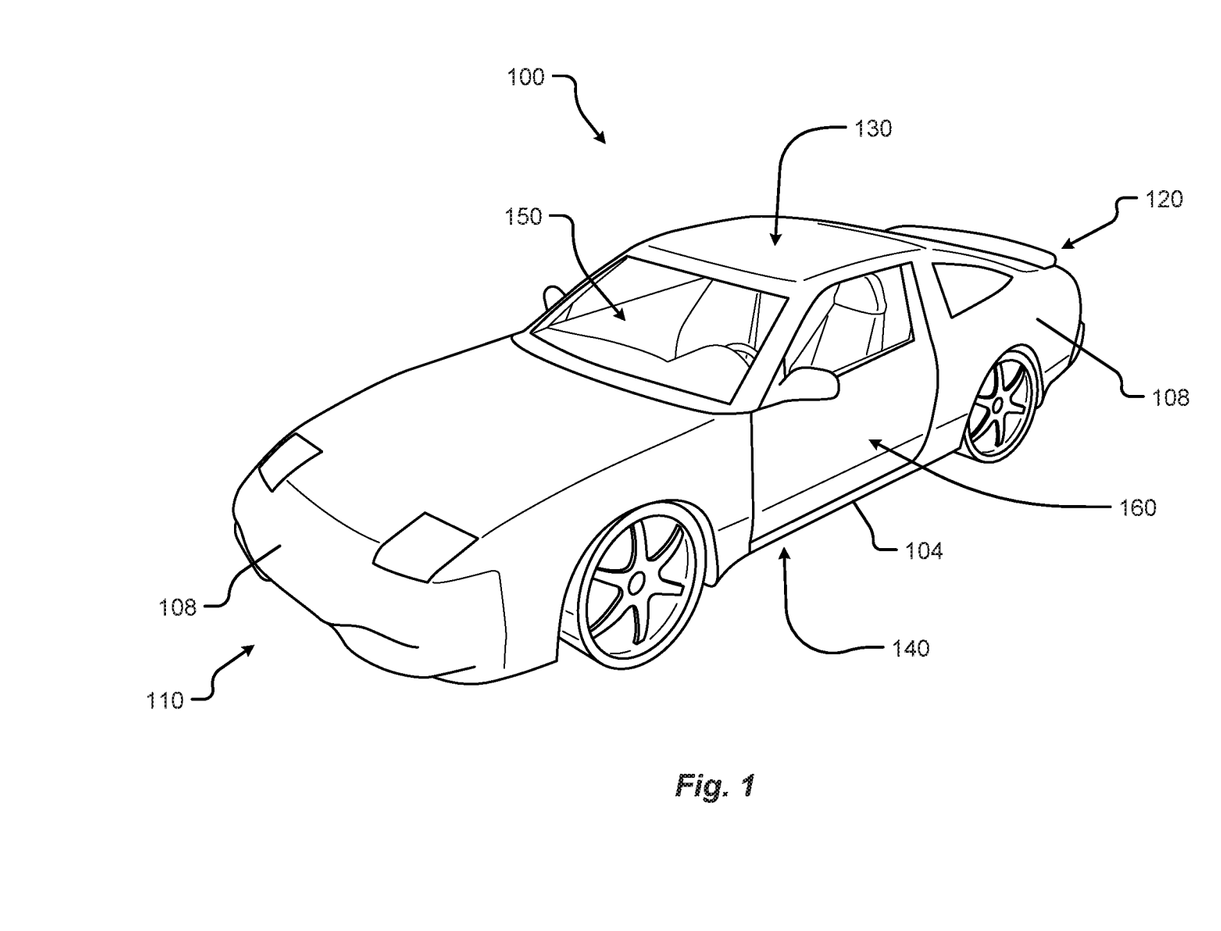
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
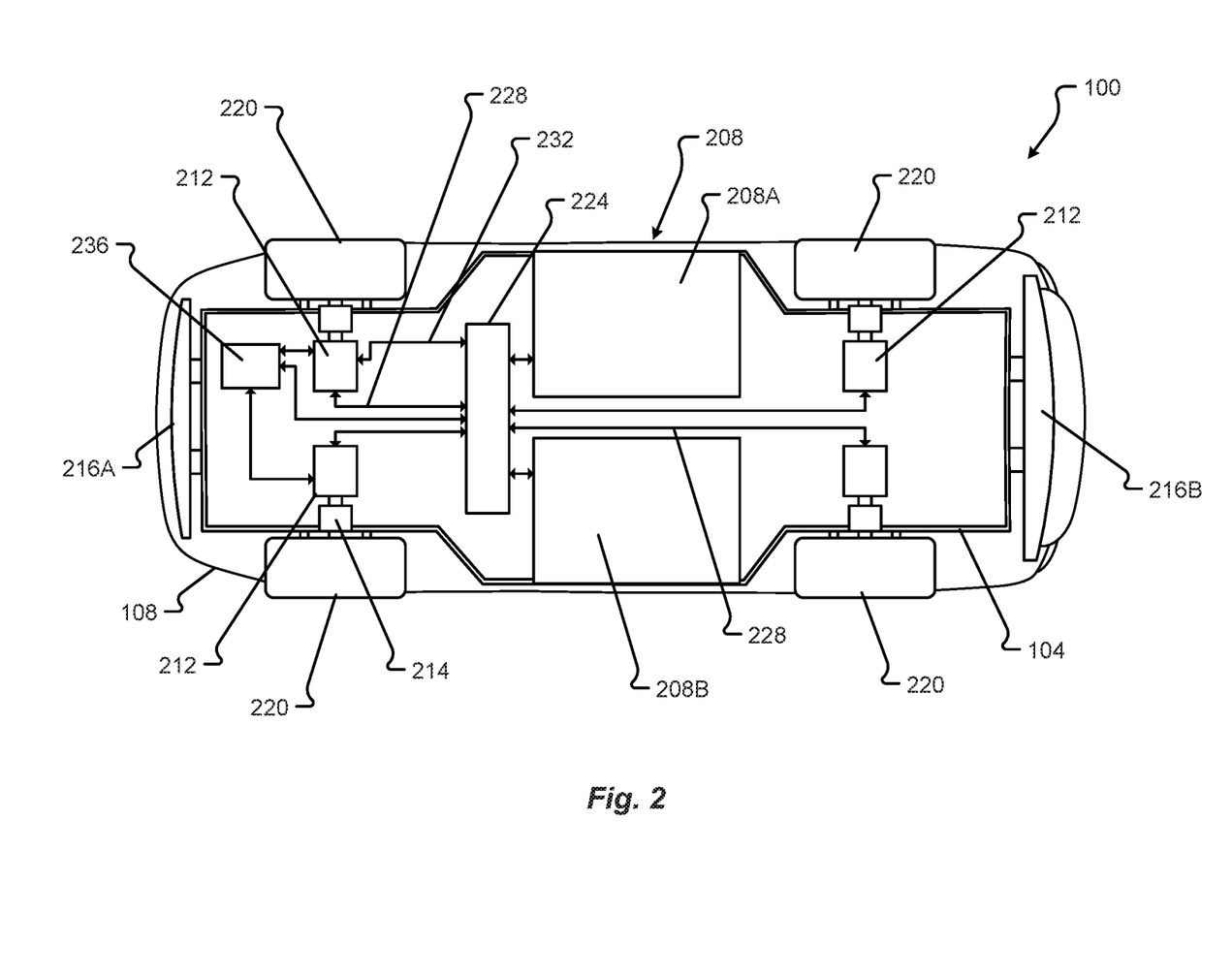
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
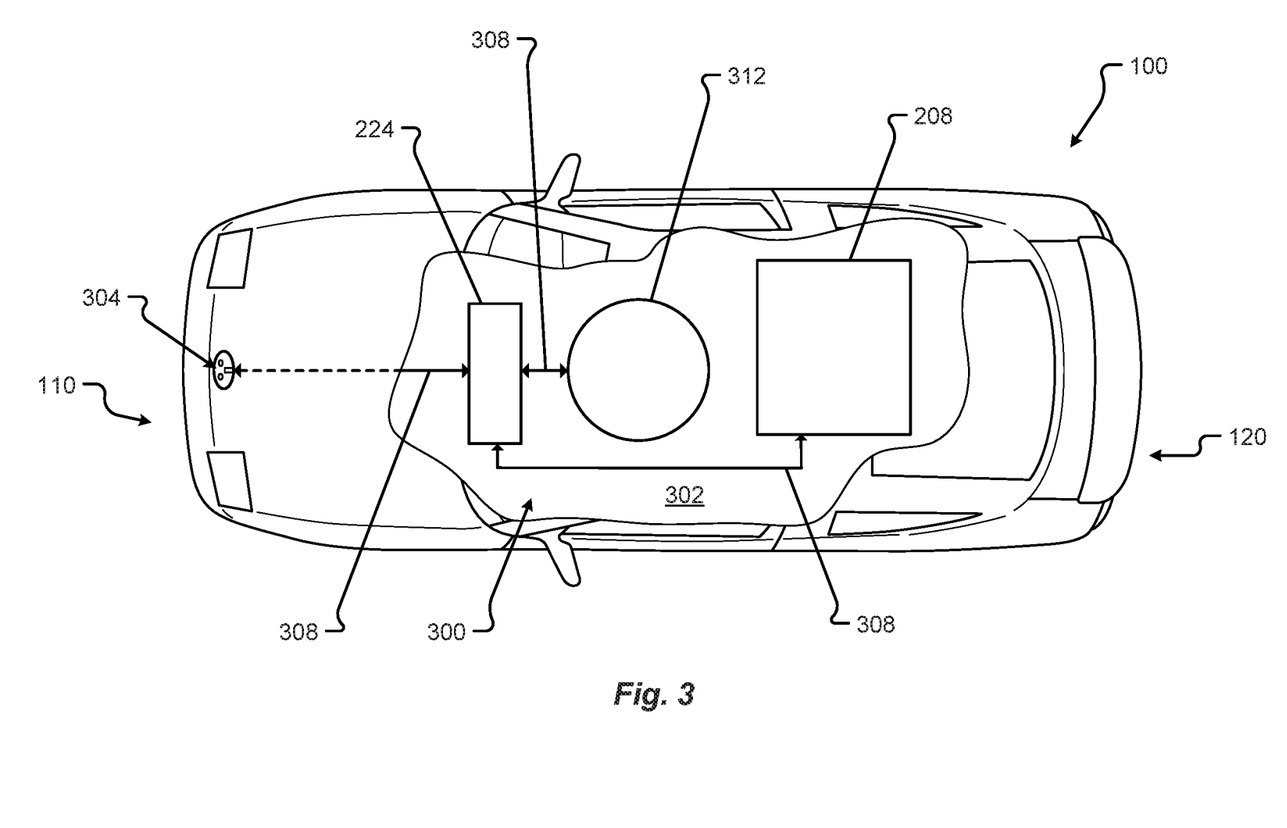
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

As noted above, the power sources 208A and 208B of the vehicle 100 can comprise a number of batteries, capacitors, or other sources of stored electrical energy. In some cases, these power sources 208A and 208B can be adapted to be removed and/or exchanged as described. Therefore, and according to one embodiment, the power sources 208A and 208B can comprise one or more modules to facilitate removal and/or change of the power sources.

Figure 4:
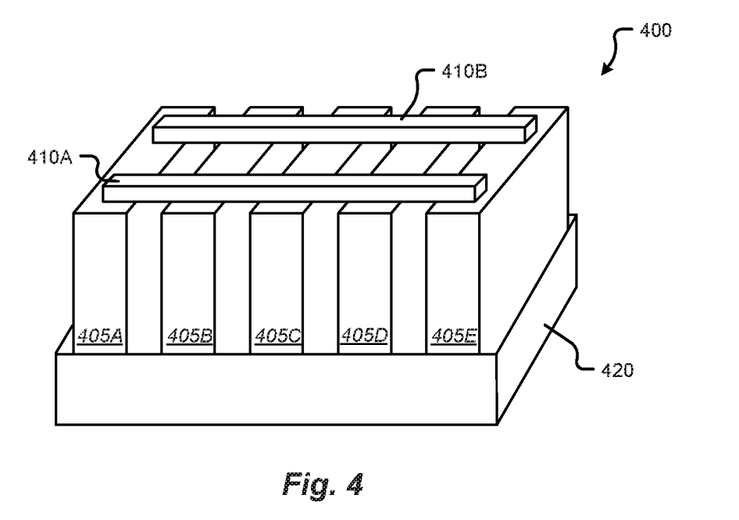
FIG. 4 is a diagram illustrating an isometric view of an assembled power source module according to one embodiment of the present disclosure.

FIG. 4 is a diagram illustrating an isometric view of an assembled power source module according to one embodiment of the present disclosure. As illustrated in this example, a power source module 400 can comprise a plurality of power cells 405A-405E such as battery or capacitor cells. The cells 405A-405E can be disposed adjacent to each other, i.e., forming a stack or similar arrangement. One or more electrical busses 410A and 410B, e.g., a positive bus 410A and/or negative bus 410B, can span the plurality of power cells 405A-405E. The bus or busses 410A and 410B can be connected with an electrical conductor (not visible here) such as a power post or connector on each of the plurality of power cells 405A 405E. A cooling plate (not visible here) can be disposed adjacent and substantially parallel to a side, e.g., the bottom side from this view, of the plurality of power cells 405A-405E. A plurality of side walls can extend from and substantially perpendicular to each edge of the cooling plate forming an open ended box or tray 420 surrounding at least a portion of the plurality of power cells 405A-405E.

Figure 5:
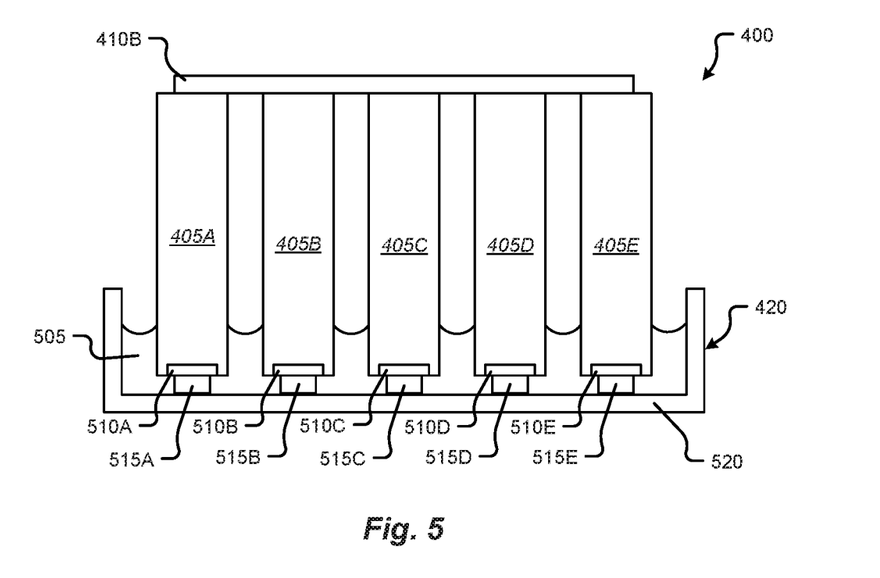
FIG. 5 is a diagram illustrating a cross-sectional side view of the power source module illustrated in FIG. 4 and according to one embodiment of the present disclosure.

FIG. 5 is a diagram illustrating a cross-sectional side view of the power source module illustrated in FIG. 4 and according to one embodiment of the present disclosure. Illustrated here and as described above are the plurality of power cells 405A-405E disposed adjacent to each other and an electrical bus 410B spanning the plurality of power cells 405A-405E. The cooling plate 520 can be disposed adjacent and substantially parallel to a side, e.g., the bottom side from this view, of the plurality of power cells 405A-405E. Side walls can be seen extending from and substantially perpendicular to edges of the cooling plate 520 forming the open topped box or tray 420 into which the power cells 405A-405E are installed. The thermally conductive potting material 505 can be seen here disposed between the plurality of power cells 405A-405E, within the open topped box or tray 420, and between the plurality of power cells 405A-405E and the cooling plate 520. According to one embodiment, the potting material 505 can initially comprise a liquid poured onto the cooling plate 520 and into the open top box or tray 420 around the power cells 405A-405E. The potting material 505 can then be allowed to cure into a solid binding the cooling plate 520 and power cells 405A-405E into a single unit while also providing a thermally conductive layer between the power cells 405A-405E and the cooling plate 520.

In some cases, the power cells 405A-405E may include a vent 510A-510E on an outside of each cell 405A-405E. For example, lithium ion cells can comprise a mechanical device such as a plate, membrane, valve, etc., built into the case of the cell that is adapted to rupture or open when an internal pressure of the cell exceeds a threshold level in order to prevent the cell from being rupturing or otherwise being damaged. According to one embodiment, a spacer 515A-515E can be disposed adjacent to the vent 510A-510E of each cell 405A-405E and between the cell 405A-405E and the cooling plate 520. Generally speaking, the spacer 515A-515E can prevent the liquid potting material 505 from covering the vents 510A-510E and preventing them from operating when the potting material 505 cures. The spacers 510A-510E can be made of a relatively soft foam or other compressible and/or destructible material that, when the vent operates, deforms or is displaced to allow pressure to be released from the cell into the void created by the displaced and/or destroyed spacer. Additionally or alternatively, and as will be described further below, the spacers 515A-515E can comprise a substantially doughnut shaped ring or a cylinder having an open center portion creating a void in the cured potting material 505 into which pressure from the cells 405A-405E can be vented.

Figure 6:
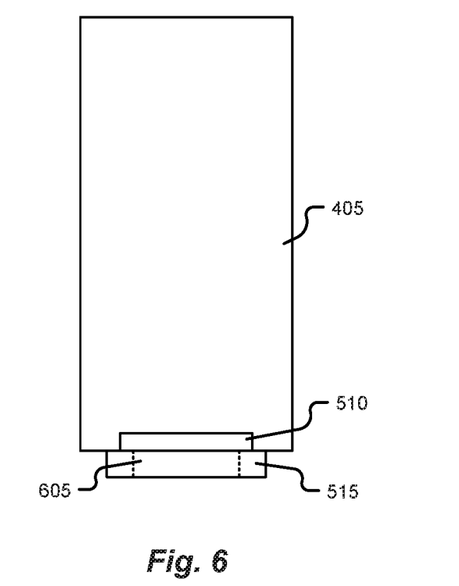
FIG. 6 is a diagram illustrating a cross-sectional side view of a power cell with spacer according to one embodiment of the present disclosure.
Figure 7:
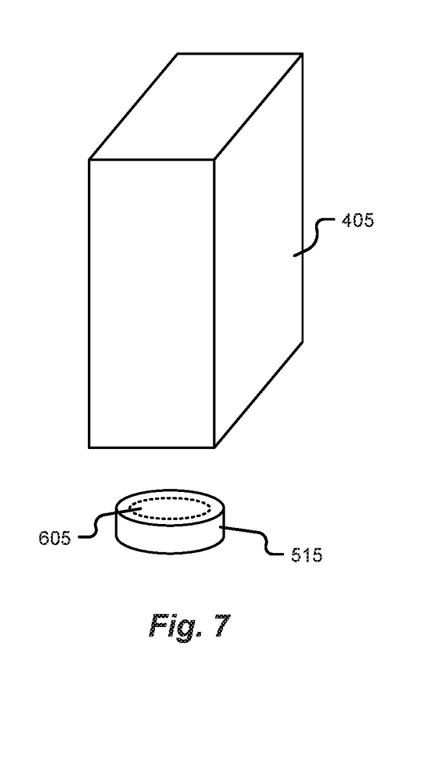
FIG. 7 is a diagram illustrating an exploded isometric view of the power cell and spacer as illustrated in FIG. 6 and according to one embodiment of the present disclosure.

FIG. 6 is a diagram illustrating a cross-sectional side view of a power cell with spacer according to one embodiment of the present disclosure. FIG. 7 is a diagram illustrating an exploded isometric view of the power cell and spacer as illustrated in FIG. 6 and according to one embodiment of the present disclosure. As illustrated here, the cell 405 can include a vent 510 disposed in the case of the cell 405. The spacer 515 can be positioned adjacent to and substantially surrounding the vent 510. As noted, the spacer 515 can comprise a material which, upon operation of the vent 510 can be compressed, displaced, and/or otherwise destroyed by the released pressure of the cell 405 and thus allowing room for expansion of released gasses and/or materials from the cell 405. Also as noted, the spacer 515 can comprise, in some cases, a substantially doughnut shaped ring or a cylinder having an open center portion 605 creating a void in the cured potting material 505 into which pressure from the cells 405A-405E can be vented.

Figure 8:
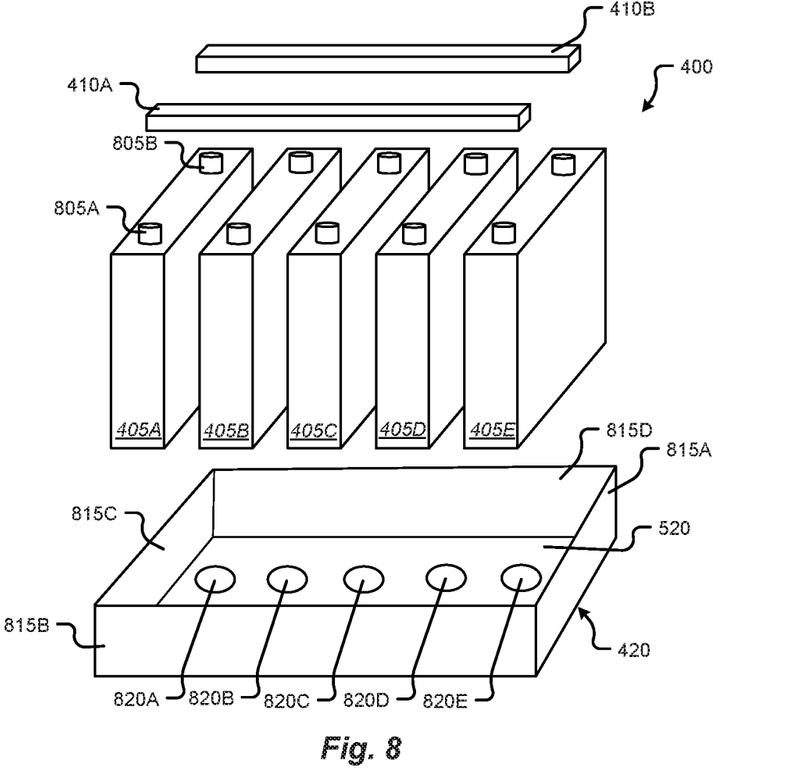
FIG. 8 is a diagram illustrating an isometric exploded view of the power source module according to an alternative embodiment of the present disclosure.
Figure 9:
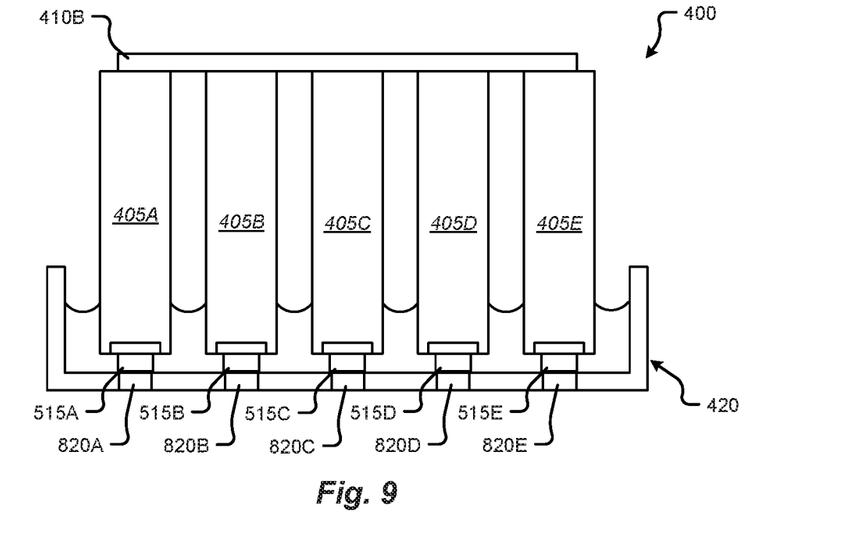
FIG. 9 is a diagram illustrating a cross-sectional side view of the power source module as illustrated in FIG. 8 and according to one embodiment of the present disclosure.

FIG. 8 is a diagram illustrating an isometric exploded view of the power source according to an alternative embodiment of the present disclosure. FIG. 9 is a diagram illustrating a cross-sectional side view of the power source module as illustrated in FIG. 8 and according to one embodiment of the present disclosure. Illustrated in these figures are the plurality of power cells 405A-405E disposed adjacent to each other and the electrical busses 410A and 410B spanning the plurality of power cells 405A-405E. As noted above, the bus or busses 410A and 410B can be connected with an electrical conductor 805A and 805B such as a power post or connector on each of the plurality of power cells 405A-405E. A cooling plate 520 can be disposed adjacent and substantially parallel to a side, e.g., the bottom side from this view, of the plurality of power cells 405A-405E. A plurality of side walls 815A, 815B, 815C, and 815D can extend from and substantially perpendicular to each edge of the cooling plate 520 and can surround at least a portion of the plurality of power cells 405A-405E. That is, the cooling plate 520 and sides 815A-815D can form an open topped box or tray 420 into which the power cells 405A-405E will be installed.

According to one embodiment, the cooling plate 520 can comprise a number of holes 820A-820E positioned to align with the vents 510A-510E of each cell 405A-405E when the power supply module 400 is assembled. Additionally, spacers can be positioned between the cells 405A-405E and cooling plate 520 and aligned with the vents 510A-510E of each cell 405A-405E and the holes 820A-820E in the cooling plate 520

The power cells 405A-405E can be held from the top, e.g., by a bus bar 410A and/or 41B or another retainer (not shown here) and lowered into the open topped box or tray 420. According to one embodiment, the power cells 405A-405E can be lowered to and retained at a position adjacent and parallel to the cooling plate 520 but without directly contacting the cooling plate 520. For example, prior to the cells 405A-405E being lowered, spacers can be placed around the holes 820A-820E in the cooling plate 520. Alternatively, the spacers can be adhered or otherwise affixed to or retained on the bottom of the cells 405A-405E around the vents 510A-510E of each cell 405A-405E prior to the cells 405A-405E being lowered. In either case, the cells 405A-405E can rest on the spacers 515A-515E which in turn contact the cooling plate 520 while also substantially surrounding and enclosing the vents 510A-510E of each cell 405A-405E and the corresponding holes 820A-820E in the cooling plate 520.

A thermally conductive potting material 505 can be disposed between the plurality of power cells 405A-405E, within the plurality of side walls 815A-815D, and between the plurality of power cells 805A-805E and the cooling plate 520. In other words, given a power source module 400 having a bottom portion with four sides 815A-815D and a cooling plate 520 (sealing off the four sides and the bottom), a layer of liquid, thermally conductive potting material 505 can be poured evenly onto the cooling plate 520, around the spacers 515A-515A, and around a bottom portion of the cells 405A-405E. Since it is initially a liquid, the potting material 505 can accommodate manufacturing deviations by allowing the cells to shift around before setting. According to one embodiment, enough potting material 505 can be used to cover the bottom of the power cells 405A-405E a few millimeters up the outside surface of each power cell. The potting material 505 can then be allowed to cure into a solid binding the cooling plate 520 and cells 405A-405E into a single, rigid structure. The spacers 515A-515E can seal the vents 510 and holes 820A-820E in the cooling plate from the potting material 505. Therefore, if a vent operates, the pressure from that cell can be allowed to escape through the spacer and aligned, corresponding hole in the cooling plate to outside of the power source module Stated another way, a power source module 400 can comprise one or more power cells 405. Each power cell can comprise a pressure vent 510 on a side of the power cell 405, the pressure vent 510 can be adapted to relieve an internal pressure of the cell 405 when the internal pressure exceeds a threshold. A cooling plate 520 can be disposed adjacent and substantially parallel to a side of the one or more power cells 405 having the pressure vent 510. One or more spacers 515 can be disposed between each of the one or more power cells 405 and the cooling plate 520 and substantially surrounding the pressure vent 510 of one of the one or more power cells 405. A thermally conductive potting material 505 can be disposed between the one or more power cells 405 and the cooling plate 505.

The potting material 505 can prevent any of the one or more power cells from directly contacting the cooling plate while providing a thermally conductive layer between the one or more power cells 405 and the cooling plate 520. The potting material 505 can also comprise a structural member between and joining the one or more power cells 405 and the cooling plate 520. Each spacer 515 can prevent the potting material 505 from intruding into an area around the vent 510 of one of the one or more power cells 405 and can create an expansion area adjacent to the vent 510 of one of the one or more power cells 405 when the vent 510 operates to relieve the internal pressure of the cell.

According to one embodiment, the cooling plate 520 can further comprise one or more holes 820. Each of the one or more holes 820 in the cooling plate 520 can be aligned with one of the spacers 515 and the vent 510 adjacent to the spacer 515. The one or more spacers 515 and the one or more holes 820 in the cooling plate 520 vent pressure from the power cells 405 to outside of the power module 400 when the vent 510 operates to relieve the internal pressure of the cell 405. In some cases, the one or more spacers 515 can comprise a substantially doughnut shaped ring having an open center portion 605. The open center portion can be aligned with the vent 510 of the adjacent power cell 405.

Assembling such a power source module 400 can comprise positioning one or more power cells 405 of the power source module 400 adjacent to a cooling plate 520 of the power source module 405. Each power cell 405 can comprise a pressure vent 510 on a side of the power cell 405. The pressure vent 510 can be adapted to relieve an internal pressure of the cell 405 when the internal pressure exceeds a threshold. A side of the one or more power cells 405 having the pressure vent 510 can be positioned adjacent and substantially parallel to the cooling plate 520. One or more spacers 515 can be positioned between each of the one of the one or more power cells 405 and the cooling plate 520 and substantially surrounding the pressure vent 510 of one of the one or more power cells 405. A liquid potting material 505 can be poured onto the cooling plate 520 and between the one or more power cells 405 and the cooling plate 520. The liquid potting material 505 can be cured into a solid providing a thermal layer between the one or more power cells 405 and the cooling plate 520 and comprising a structural member between and retaining each of the one or more power cells 405 and joining the one or more power cells 405 and the cooling plate 520 into a solid unit. Each spacer 515 can prevent the potting material from intruding into an area around the vent 510 of one of the one or more power cells 405. Each spacer 515 can create an expansion area adjacent to the vent 510 of one of the one or more power cells 405 when the vent operates to relieve the internal pressure of the cell. Each of the one of the spacers 515 can further be aligned with the vent 510 adjacent to the spacer 515 and with one or more holes 820 in the cooling plate 520. The one or more spacers 515 and the one or more holes 820 in the cooling plate 520 can vent pressure from the power cells 405 to outside of the power module 400 when the vent operates to relieve the internal pressure of the cell 405.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a power source module comprising: one or more power cells, each power cell comprising a pressure vent on a side of the power cell, the pressure vent adapted to relieve an internal pressure of the cell when the internal pressure exceeds a threshold; a cooling plate disposed adjacent and substantially parallel to a side of the one or more power cells having the pressure vent; one or more spacers, each spacer disposed between one of the one or more power cells and the cooling plate and substantially surrounding the pressure vent of one of the one or more power cells; and a thermally conductive potting material disposed between the one or more power cells and the cooling plate.

Aspects of the above power source module include wherein the potting material prevents any of the one or more power cells from directly contacting the cooling plate, provides a thermally conductive layer between the one or more power cells and the cooling plate, and comprises a structural member between and joining the one or more power cells and the cooling plate.

Aspects of the above power source module include wherein each spacer prevents the potting material from intruding into an area around the vent of one of the one or more power cells.

Aspects of the above power source module include wherein each spacer creates an expansion area adjacent to the vent of one of the one or more power cells when the vent operates to relieve the internal pressure of the cell.

Aspects of the above power source module include wherein the cooling plate further comprises one or more holes, each of the one or more holes in the cooling plate aligned with one of the spacers and the vent adjacent to the spacer.

Aspects of the above power source module include wherein the one or more spacers and the one or more holes in the cooling plate vent pressure from the power cells to outside of the power module when the vent operates to relieve the internal pressure of the cell.

Aspects of the above power source module include wherein the one or more spacers comprise a substantially doughnut shaped ring having an open center portion, the open center portion aligned with the vent of the adjacent power cell.

Aspects of the above power source module include wherein the potting material comprises a liquid prior to being cured into a solid, wherein the liquid potting material is poured onto the cooling plate and around the one or more power cells prior to curing.

Embodiments include an electric vehicle comprising: a power source module providing electrical power to one or more components of the electric vehicle, the power source module comprising: one or more power cells, each power cell comprising a pressure vent on a side of the power cell, the pressure vent adapted to relieve an internal pressure of the cell when the internal pressure exceeds a threshold; a cooling plate disposed adjacent and substantially parallel to a side of the one or more power cells having the pressure vent; one or more spacers, each spacer disposed between one of the one or more power cells and the cooling plate and substantially surrounding the pressure vent of one of the one or more power cells; and a thermally conductive potting material disposed between the one or more power cells and the cooling plate.

Aspects of the above vehicle include wherein the potting material prevents any of the one or more power cells from directly contacting the cooling plate, provides a thermally conductive layer between the one or more power cells and the cooling plate, and comprises a structural member between and joining the one or more power cells and the cooling plate.

Aspects of the above vehicle include wherein each spacer prevents the potting material from intruding into an area around the vent of one of the one or more power cells.

Aspects of the above vehicle include wherein each spacer creates an expansion area adjacent to the vent of one of the one or more power cells when the vent operates to relieve the internal pressure of the cell.

Aspects of the above vehicle include wherein the cooling plate further comprises one or more holes, each of the one or more holes in the cooling plate aligned with one of the spacers and the vent adjacent to the spacer.

Aspects of the above vehicle include wherein the one or more spacers and the one or more holes in the cooling plate vent pressure from the power cells to outside of the power module when the vent operates to relieve the internal pressure of the cell.

Aspects of the above vehicle include wherein the one or more spacers comprise a substantially doughnut shaped ring having an open center portion, the open center portion aligned with the vent of the adjacent power cell.

Aspects of the above vehicle include wherein the potting material comprises a liquid prior to being cured into a solid, wherein the liquid potting material is poured onto the cooling plate and around the one or more power cells prior to curing.

Embodiments include a method for assembling a power source module, the method comprising: positioning one or more power cells of the power source module adjacent to a cooling plate of the power source module, each power cell comprising a pressure vent on a side of the power cell, the pressure vent adapted to relieve an internal pressure of the cell when the internal pressure exceeds a threshold, a side of the one or more power cells having the pressure vent positioned adjacent and substantially parallel to the cooling plate; positioning one or more spacers between each of the one of the one or more power cells and the cooling plate and substantially surrounding the pressure vent of one of the one or more power cells; pouring a liquid potting material onto the cooling plate and between the one or more power cells and the cooling plate; and curing the liquid potting material into a solid, wherein the solid potting material provides a thermal layer between the one or more power cells and the cooling plate, wherein the solid potting material comprises a structural member between and retaining each of the one or more power cells, wherein the potting material joins the one or more power cells and the cooling plate into a solid unit, and wherein each spacer prevents the potting material from intruding into an area around the vent of one of the one or more power cells.

Aspects of the above method include wherein each spacer creates an expansion area adjacent to the vent of one of the one or more power cells when the vent operates to relieve the internal pressure of the cell.

Aspects of the above method further include aligning each of the one of the spacers and the vent adjacent to the spacer with one or more holes in the cooling plate, wherein the one or more spacers and the one or more holes in the cooling plate vent pressure from the power cells to outside of the power module when the vent operates to relieve the internal pressure of the cell.

Aspects of the above method include wherein the one or more spacers comprise a substantially doughnut shaped ring having an open center portion, the open center portion aligned with the vent of the adjacent power cell.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A power source module comprising:
   one or more power cells, each power cell comprising a pressure vent on a side of the power cell, the pressure vent adapted to relieve an internal pressure of the cell when the internal pressure exceeds a threshold;
   a cooling plate disposed adjacent and substantially parallel to a side of the one or more power cells having the pressure vent;
   one or more spacers, each spacer disposed between one of the one or more power cells and the cooling plate and substantially surrounding the pressure vent of one of the one or more power cells; and
   a thermally conductive potting material disposed between the one or more power cells and the cooling plate, wherein the potting material prevents any of the one or more power cells from directly contacting the cooling plate, provides a thermally conductive layer between the one or more power cells and the cooling plate, and comprises a structural member between and joining the one or more power cells and the cooling plate, and wherein each spacer prevents flow of the liquid potting material into an area around the vent of one of the one or more power cells while the potting material cures.

2. The power source module of claim 1, wherein each spacer creates an expansion area in the cured potting material between each cell and the cooling plate adjacent to the vent of one of the one or more power cells when the vent operates to relieve the internal pressure of the cell.

3. The power source module of claim 2, wherein the cooling plate further comprises one or more holes, each of the one or more holes in the cooling plate aligned with one of the spacers and the vent adjacent to the spacer.

4. The power source module of claim 3, wherein the one or more spacers and the one or more holes in the cooling plate vent pressure from the power cells to outside of the power module when the vent operates to relieve the internal pressure of the cell.

5. The power source module of claim 4, wherein the one or more spacers comprise a substantially doughnut shaped ring having an open center portion, the open center portion aligned with the vent of the adjacent power cell.

6. The power source module of claim 1, wherein the liquid potting material is poured onto the cooling plate and around the one or more power cells prior to curing.

7. An electric vehicle, comprising:
   a power source module providing electrical power to one or more components of the electric vehicle, the power source module comprising:
   one or more power cells, each power cell comprising a pressure vent on a side of the power cell, the pressure vent adapted to relieve an internal pressure of the cell when the internal pressure exceeds a threshold;
   a cooling plate disposed adjacent and substantially parallel to a side of the one or more power cells having the pressure vent;
   one or more spacers, each spacer disposed between one of the one or more power cells and the cooling plate and substantially surrounding the pressure vent of one of the one or more power cells; and
   a thermally conductive potting material disposed between the one or more power cells and the cooling plate, wherein the potting material prevents any of the one or more power cells from directly contacting the cooling plate, provides a thermally conductive layer between the one or more power cells and the cooling plate, and comprises a structural member between and joining the one or more power cells and the cooling plate, and wherein each spacer prevents flow of the liquid potting material into an area around the vent of one of the one or more power cells while the potting material cures.

8. The vehicle of claim 7, wherein each spacer creates an expansion area in the cured potting material between each cell and the cooling plate adjacent to the vent of one of the one or more power cells when the vent operates to relieve the internal pressure of the cell.

9. The vehicle of claim 8, wherein the cooling plate further comprises one or more holes, each of the one or more holes in the cooling plate aligned with one of the spacers and the vent adjacent to the spacer.

10. The vehicle of claim 9, wherein the one or more spacers and the one or more holes in the cooling plate vent pressure from the power cells to outside of the power module when the vent operates to relieve the internal pressure of the cell.

11. The vehicle of claim 10, wherein the one or more spacers comprise a substantially doughnut shaped ring having an open center portion, the open center portion aligned with the vent of the adjacent power cell.

12. The vehicle of claim 7, wherein the liquid potting material is poured onto the cooling plate and around the one or more power cells prior to curing.

* * * * *

UNITED STATES PATENT AND TRADEMARK OFFICE
CERTIFICATE OF CORRECTION

| | |
|---|---|
| PATENT NO. | : 10,601,090 B2 |
| APPLICATION NO. | : 15/581216 |
| DATED | : March 24, 2020 |
| INVENTOR(S) | : Austin L. Newman et al. |

It is certified that error appears in the above-identified patent and that said Letters Patent is hereby corrected as shown below:

In the Claims

Claim 1, Column 17, Line 46, after "each power cell" insert --of the one or more power cells-- therein.
Claim 1, Column 17, Line 53, after "each spacer" insert --of the one or more spacers being-- therein.
Claim 7, Column 18, Line 27, after "each power cell" insert --of the one or more power cells-- therein.
Claim 7, Column 18, Line 34, after "each spacer" insert --of the one or more spacers being-- therein.

Signed and Sealed this
Twelfth Day of May, 2020

Andrei Iancu
*Director of the United States Patent and Trademark Office*